United States Patent [19]

Schickedanz

[11] 4,107,733
[45] Aug. 15, 1978

[54] FACSIMILE COLOR BLEACHING COPYING METHOD

[76] Inventor: Willi Schickedanz, Langener Strasse 70, 605 Offenbach am Main, Germany

[21] Appl. No.: 646,498

[22] Filed: Jan. 5, 1976

[30] Foreign Application Priority Data

Jan. 8, 1975 [DE] Fed. Rep. of Germany ....... 2500520

[51] Int. Cl.² ...................... H04N 1/46; G01D 15/10
[52] U.S. Cl. ...................................... 358/75; 346/76 L
[58] Field of Search .................. 358/75, 6; 346/76 L, 346/157, 160; 96/48 R, 11, 27 H

[56] References Cited

U.S. PATENT DOCUMENTS

| 2,912,487 | 11/1959 | Horsley | 358/6 |
| 3,679,818 | 7/1972 | Courtner-Pratt | 358/75 |
| 3,842,195 | 10/1974 | Takahashi et al. | 358/75 |

Primary Examiner—Robert L. Griffin
Assistant Examiner—Aristotelis M. Psitos
Attorney, Agent, or Firm—Michael J. Striker

[57] ABSTRACT

A receiving scanner and an emitting scanner are working together synchronously for either analyzing or reconstructing a model or pattern. The reconstruction of the pattern can be carried out by a laser with deflectable light beam, whereby the laser beam bleaches the color points of a special copy paper in correspondence to the colors of the pattern. Thus, black-and-white as well as colored copies can be made very quickly and of high quality.

7 Claims, 3 Drawing Figures

*Fig. 1a*
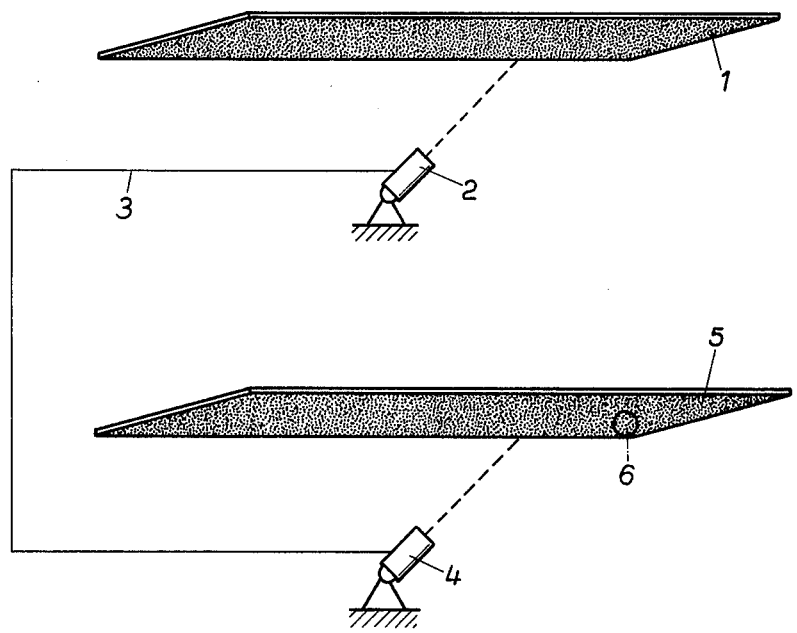
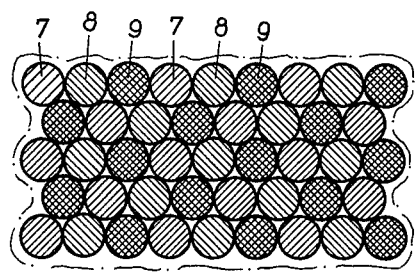
*Fig. 1b*

FACSIMILE COLOR BLEACHING COPYING METHOD

BACKGROUND OF THE INVENTION

There is an ever increasing need for making black-and-white or coloured copies of two- or three-dimensional patterns. Since, in many cases, copies have to be made very quickly and abundantly, it is an aim to reduce the copy-time and to use materials of less expense. This is one of the main reasons for the fact that electrophotography, as a method of making copies, becomes more popular than normal photography, though the quality of xerographic copies, however, is rather tolerated than welcomed.

Coloured bodies or patterns are usually copied by photographing them. For this purpose, different kinds of films are used, which are expensive and which must be developed by several phases, e.g. rinsing, fixing, washing and drying. A method, which enables to make copies quickly and in an easy way, has been proposed by E. H. Land and H. G. Rogers. It is well known under the trade mark POLARCOLOR. This method is a subtractive three-colour-process, which includes a diffusion of colour molecules into the positive surface, the molecules coming from negative. Although this method is very easy to handle, the film is expensive because of its eight layers.

Another method of making coloured copies has been described in the U.S. Pat. No. 2,297,691, p. 6 of Carlson. This method is well-known as the process of Xerography. It comprises the projection of a colour on a metal plate, whereby the colour had been separated by a filter. In a next step the plate will be developed by fixing coloured ink-dust on it. Then the same process will be repeated for another colour and thus different kinds of ink-dust are deposited in layers. Though this proposal has been made more than 35 years ago, there does not exist any satisfactory working Colour-Xerography up to now.

A further proposal for making coloured copies is made in the French Pat. No. 1,450,843. This patent teaches how to suspend light-absorbing particles of different colours in a fluid, which is placed in between electrodes of certain voltages. When the suspension is exposed to the light, the particles flow to one of the electrodes thus making a visible copy of a pattern. The disadvantage of this method, however, lies in the fact that the particles must change their polarities when exposed to the light.

SUMMARY OF THE INVENTION

In order to make coloured copies of pictures, drawings, etc., a method is provided, by which a pattern is scanned point-by-point and the colour intensities of the scanned points are converted into control signals. The control signals are led to a light source, the intensity of its light beam being influenced by the intensity of the control signal. The scanner and the light source are working synchronously. If the control signals are led to a light-source, e.g. a laser with a deflectable light beam, a special paper with colour points or triplets is bleached in accordance with the original colours of the pattern.

The advantage of the invention is that chemical substances can be used, which are unfadable under normal day light and which are bleaching under special electromagnetic wavelengths or intensities. Since the bleaching process is an event, which happens more or less to all coloured substances, one has only to select those substances, which don't bleach under normal conditions, but under artificial lighting. The invention possesses other objects and features of advantage, some of which will be set forth in the following description of a form of the invention which is illustrated in the drawings accompanying and forming part of this specification.

BRIEF DESCRIPTION OF THE DRAWINGS

FIG. 1 is a schematic diagram of an arrangement for realizing the inventive method.

DESCRIPTION OF THE PREFERRED EMBODIMENT

Figure 2:
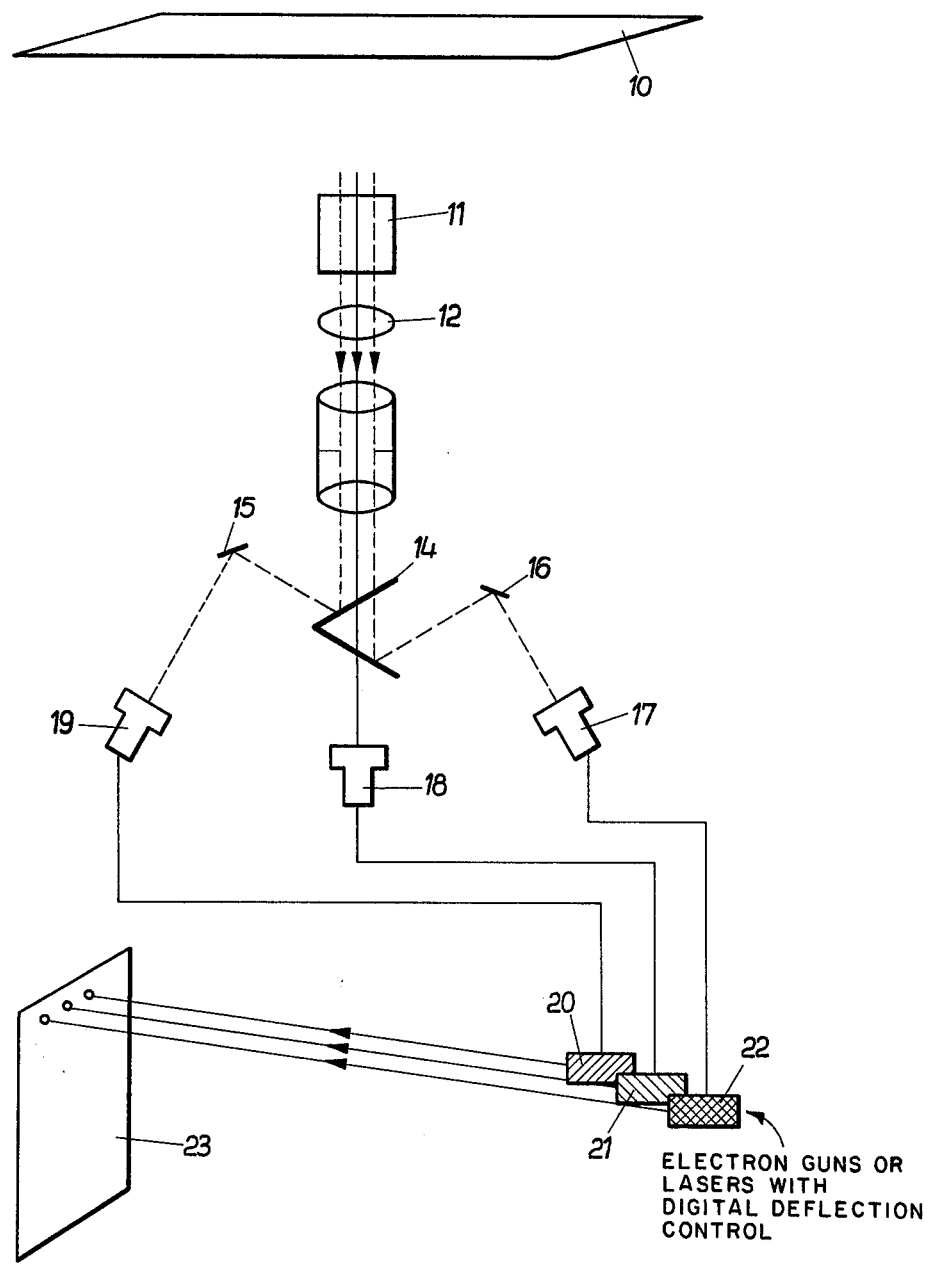
FIG. 2 is an arrangement for realizing the inventive method by using plumbicon-tubes.

FIG. 1$d$ shows, in general, an arrangement for making copies, which comprises a step-by-step scanning device. A coloured pattern 1, which may be a colour photograph or a page of a magazine, shows down with its surface. A scanner 2 is scanning the intensity of the colour component of the pattern line-by-line and point-by-point. The scanner may be of such kind as described in the U.S. patent application of Sept. 26, 1968, Ser. No. 762,787 or of such kind as described in the German Auslegeschrift No. 1,156,637, corresponding to U.S. patent application of Apr. 17, 1958, Ser. No. 729,121, or of such kind as described in the German Pat. No. 20 34 679, corresponding to U.S. patent application of July 14, 1969, Ser. No. 841,435.

The intensities of the colours which are registered by that way, are leaded via a line 3 to a light source 4, which works synchronously together with the scanner 2, i.e. its motions are proportional to those of the scanner 2. The light source 4 may be, for example, a ray of electrons or a laser beam. If it is a laser beam, it may be deflectable. The frequency of the light of the laser may also be variable, so that only one complete motion over the label is needed to reconstruct the pattern. But the light source may also comprise three separate lasers, each of which has a different wavelength. In the latter case the three lasers will send their lights simultaneously to the colour triplet. From this it can be seen that the light beam(s) of a light source 4 scans the label 5 in a similar way as it does the scanner 2 with the pattern 1.

FIG. 1$b$ shows a segment of a label 5 in detail. This label has coloured points like a television screen. In a line the blue points 7 are followed by the green points 8, which, in turn, are followed by the red points 9. The main difference between the screen of a colour TV tube and the label 5 are the properties of the chemical substances. In a television tube a colour point lights up when it is touched by a beam of electrons, whereas the colour point of the label 5 bleaches more or less when it is reached by a laser beam. The more intensive the light beam, the more intensive the bleaching. Chemical substances, which fulfill the necessary requirements are, for example

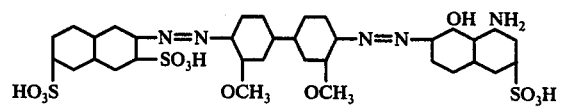

for blue (see: Paul Karrer, Lehrbuch der organischen Chemie, 4th edition, 1936, p. 495) and

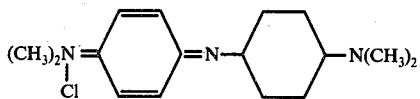

for green (Bindschedler's Green, see: Karrer, p. 588) and

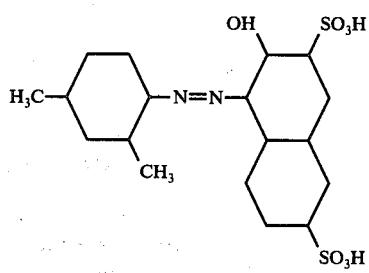

for red (Ponceau 2R, see: Karrer, p. 489)

If the scanner 2 realizes, for example, that a certain point of the pattern 1 is of strong blue intensity, the blue point on the label 5 has not to be bleached. When this point, however, is of only low blue intensity, its correspondent on the label 5 must be bleached intensively. This is, in some respect, an inverse control of the light source 4 by the scanner 2, i.e., the intensity of the bleaching beam at any given moment is inversely related to the intensity of the corresponding scanned point on the pattern 1 to be copied.

The described method concerns the additive mixing of colours. It may, however, also be used when mixing the colours subtractively. For that purpose the layers of the colour may be superimposed, each of which responds to one wavelength only.

FIG. 2 shows a special arrangement for realizing the inventive method. The pattern 10, which has to be copied, will be divided via an objective 11, a field lens 12, a shutter 13 and a system of beam-dividing mirrors 14, 15, 16 into basic colours and led to plumbicon tubes for red colour 17, green colour 18 and blue colour 19. The electrical signals, which correspond to the colours, are leaded to three separate light sources 20, 21, 22, which correspond to one of the colours being on the label 23. The sources of electromagnetic waves may be electronic guns or lasers. If they are lasers then they should have a deflectable light beam as it is described, for example, in the U.S. Pat. Nos. 3,499,700, 3,517,200, 3,626,511.

Instead of plumbicon tubes, which are shown in FIG. 2, also four-tube-cameras may be used, which carry a separate signal of luminance for reducing the accuracy, which is necessary for the registration of the colour.

Further means for improving the inventive method lie within the scope of the invention, such as lighting the pattern 10 by an additional light source for getting an increased luminance.

It is also possible to scan the pattern as well as the copy label simultaneously instead of successively. For this purpose, the scanner should be replaced by a plurality of scanners which are working in parallel.

What I claim is:

1. A method of making copies, comprising the following steps:
   (a) dividing the pattern, which is to be copied, simultaneously into its components of colour;
   (b) scanning the components of colour simultaneously point by point and converting the intensities of the coloured points into control signals;
   (c) leading the control signals to electromagnetic sources, the beams of which are deflectable and the intensities of the beams being correspondent to the intensity of the control signals;
   (d) bleaching the intensity of the components of colour in a special copy paper, wherein the colour components are arranged by points which lie side-by-side, the bleaching of a certain area of the copy paper corresponding to the inverse intensity of colours in the corresponding area of the pattern.

2. A method of making copies defined in claim 1, wherein said special copy paper comprises a plurality of coloured points, which are arranged in a similar way as the colour points of a television tube and the intensity of which can be bleached by electromagnetic waves outside of the visible range, whilst the intensity of colour remains constant when touched by electromagnetic waves within the visible range.

3. Method for making copies as defined in claim 1, wherein said light sources are lasers with digital light beam deflectors.

4. A method of making copies as defined in claim 1, wherein the colour information of a pattern is divided into colour components by a system of mirrors.

5. A method of making copies, comprising the following steps:
   (a) dividing the pattern, which is to be copied, successively into its components of colour;
   (b) scanning the components of colour successively point by point and converting the intensities of the coloured points into control signals;
   (c) leading the control signals to electromagnetic sources, the beams of which are deflectable and the intensity of the beams being correspondent to the intensity of the control signals;
   (d) bleaching the intensity of the components of colour in a special copy paper, wherein the colour components are arranged by points which lie superimposed, the bleaching of a certain area of the copy paper corresponding to the inverse intensity of the colours in the corresponding area of the pattern.

6. A method for making copies as defined in claim 5, wherein said light sources are lasers with digital light beam deflectors.

7. A method of making copies as defined in claim 5, wherein the colour information of a pattern is divided into colour components by a system of mirrors.

* * * * *